US009988965B2

(12) United States Patent
Tsuchiya et al.

(10) Patent No.: US 9,988,965 B2
(45) Date of Patent: Jun. 5, 2018

(54) COOLANT CONTROL VALVE APPARATUS

(71) Applicant: MIKUNI CORPORATION, Tokyo (JP)

(72) Inventors: Toru Tsuchiya, Odawara (JP); Kazuki Sato, Odawara (JP); Masayuki Daikuhara, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 171 days.

(21) Appl. No.: 14/400,842

(22) PCT Filed: May 14, 2013

(86) PCT No.: PCT/JP2013/063357
§ 371 (c)(1),
(2) Date: Nov. 13, 2014

(87) PCT Pub. No.: WO2013/172321
PCT Pub. Date: Nov. 21, 2013

(65) Prior Publication Data
US 2015/0122359 A1    May 7, 2015

(30) Foreign Application Priority Data

May 15, 2012  (JP) ................................. 2012-111242

(51) Int. Cl.
*F16K 11/085*    (2006.01)
*F01P 7/14*    (2006.01)
(Continued)

(52) U.S. Cl.
CPC .................. *F01P 7/14* (2013.01); *F01P 7/16* (2013.01); *F01P 11/16* (2013.01); *F16K 5/04* (2013.01);
(Continued)

(58) Field of Classification Search
CPC .... F16K 5/0407; F16K 5/0442; F16K 5/0457; F16K 5/0485
(Continued)

(56) References Cited

U.S. PATENT DOCUMENTS 604,835 A * 5/1898 McCarroll .......... F16K 11/0853
137/550
1,166,571 A * 1/1916 Bard ......................... F16K 3/06
137/625.45
(Continued)

FOREIGN PATENT DOCUMENTS

EP    2295757 A1    3/2011
JP    9-96364 A    4/1997
(Continued)

OTHER PUBLICATIONS

International Search Report dated Jul. 2, 2013, issued in corresponding application No. PCT/JP2013/063357.
(Continued)

*Primary Examiner* — John Fox
(74) *Attorney, Agent, or Firm* — Westerman, Hattori, Daniels & Adrian, LLP

(57) ABSTRACT

An engine cooling system compromises a main channel connecting an engine and a radiator, and a coolant control valve apparatus controlling a flow rate of coolant water in the main channel having a main rotary valve. The main valve includes a rotor and a casing that has an inner peripheral surface facing an outer peripheral surface of this rotor, and a gap is provided between the outer peripheral surface of the rotor and the inner peripheral surface of the casing. The inner peripheral surface of the casing has a main opening part that is connected to the main channel, and this main opening part is provided with a sealing member that protrudes to the outer peripheral surface of the rotor. This
(Continued)

sealing member composes a channel that connects an opening part of the rotor and an opening part of the casing.

4 Claims, 10 Drawing Sheets

(51) Int. Cl.
*F01P 7/16* (2006.01)
*F16K 5/04* (2006.01)
*F01P 11/16* (2006.01)

(52) U.S. Cl.
CPC ........ *F16K 5/0471* (2013.01); *F16K 11/0853* (2013.01); *F01P 2007/146* (2013.01); *F01P 2031/32* (2013.01); *Y10T 137/86871* (2015.04)

(58) Field of Classification Search
USPC ...................................... 137/625.47; 251/174
See application file for complete search history.

(56) References Cited

U.S. PATENT DOCUMENTS

| | | | | |
|---|---|---|---|---|
| 2,471,941 A * | 5/1949 | Downey | ............... | F16K 5/0464 137/375 |
| 2,503,639 A * | 4/1950 | Snyder | .................. | F16K 5/0464 137/625.47 |
| 2,610,023 A * | 9/1952 | Whitlock | ................ | F16K 5/184 137/625.29 |
| 2,611,577 A * | 9/1952 | Grant, Jr. | ............. | A62C 99/009 137/266 |
| 2,639,883 A * | 5/1953 | Smith | .................... | F16K 5/0464 251/170 |
| 2,698,731 A * | 1/1955 | Koehler | ................ | F16K 5/0657 137/625.47 |
| 2,907,349 A * | 10/1959 | White | ................... | E21D 15/585 137/625.23 |
| 3,058,488 A * | 10/1962 | Hirst | ........................ | B03B 5/24 137/596 |
| 3,076,631 A * | 2/1963 | Grove | ....................... | F16K 1/22 137/242 |
| 3,214,131 A * | 10/1965 | Boldt | ...................... | F16K 5/201 251/170 |
| 3,674,238 A * | 7/1972 | Pickles | ..................... | F16K 5/04 137/904 |
| 3,966,119 A * | 6/1976 | Harter | ................ | B60H 1/00485 137/625.47 |
| 4,050,472 A * | 9/1977 | Sheppard | ........... | B60H 1/00485 137/242 |
| 4,572,239 A * | 2/1986 | Koch | .................. | F16K 11/0873 137/312 |
| 4,705,058 A * | 11/1987 | Marklew | ........... | B29C 45/14754 137/15.24 |
| 4,936,548 A * | 6/1990 | Heinemann | ............ | B65G 53/52 251/316 |
| 5,617,815 A | 4/1997 | Spies et al. | | |
| 6,648,001 B2 * | 11/2003 | Chatufale | ............. | F16K 5/0471 137/15.18 |
| 6,655,658 B2 * | 12/2003 | Neal | ...................... | F16K 5/0471 251/309 |
| 6,675,825 B1 * | 1/2004 | Reeves | ................... | F16K 5/225 137/15.24 |
| 6,994,316 B2 * | 2/2006 | Pervaiz | ................. | F16K 5/0478 251/160 |
| 8,342,204 B2 * | 1/2013 | Dirker | ....................... | F01L 7/10 123/80 BA |
| 9,212,751 B2 * | 12/2015 | McLane | ................ | F16K 5/0471 |
| 2001/0013553 A1 * | 8/2001 | Chamot | .................. | F16K 31/04 236/12.11 |
| 2002/0189692 A1 * | 12/2002 | Sato | ..................... | F16K 11/0853 137/625.47 |
| 2003/0005966 A1 * | 1/2003 | Johann | .................. | F16K 11/076 137/625.47 |
| 2003/0098077 A1 * | 5/2003 | McLane | ............. | B60H 1/00485 137/625.47 |
| 2013/0221116 A1 * | 8/2013 | Tsuchiya | .................. | F01P 7/14 236/34.5 |
| 2014/0190427 A1 * | 7/2014 | Nagahama | ................ | F01P 7/16 123/41.1 |
| 2015/0075452 A1 * | 3/2015 | Oikawa | ..................... | F01P 7/14 123/41.1 |
| 2015/0075658 A1 * | 3/2015 | Tsuchiya | .................. | F16K 5/04 137/625.47 |
| 2015/0083057 A1 * | 3/2015 | Tsuchiya | .................. | F01P 7/14 123/41.08 |
| 2015/0122359 A1 * | 5/2015 | Tsuchiya | .................. | F01P 7/16 137/625.47 |

FOREIGN PATENT DOCUMENTS

| | | |
|---|---|---|
| JP | 9-112715 A | 5/1997 |
| JP | H09112715 A | 5/1997 |
| JP | 9-210224 A | 8/1997 |
| JP | 2002-97958 A | 4/2002 |
| JP | 2002-106347 A | 4/2002 |
| JP | 2002-166362 A | 6/2002 |
| JP | 2005-510668 A | 4/2005 |
| WO | 03/046342 A1 | 6/2003 |

OTHER PUBLICATIONS

European Search Report dated Nov. 10, 2015 issued in counterpart European Patent Application No. 13790122.9, (7 pages).

* cited by examiner

[Fig. 1]
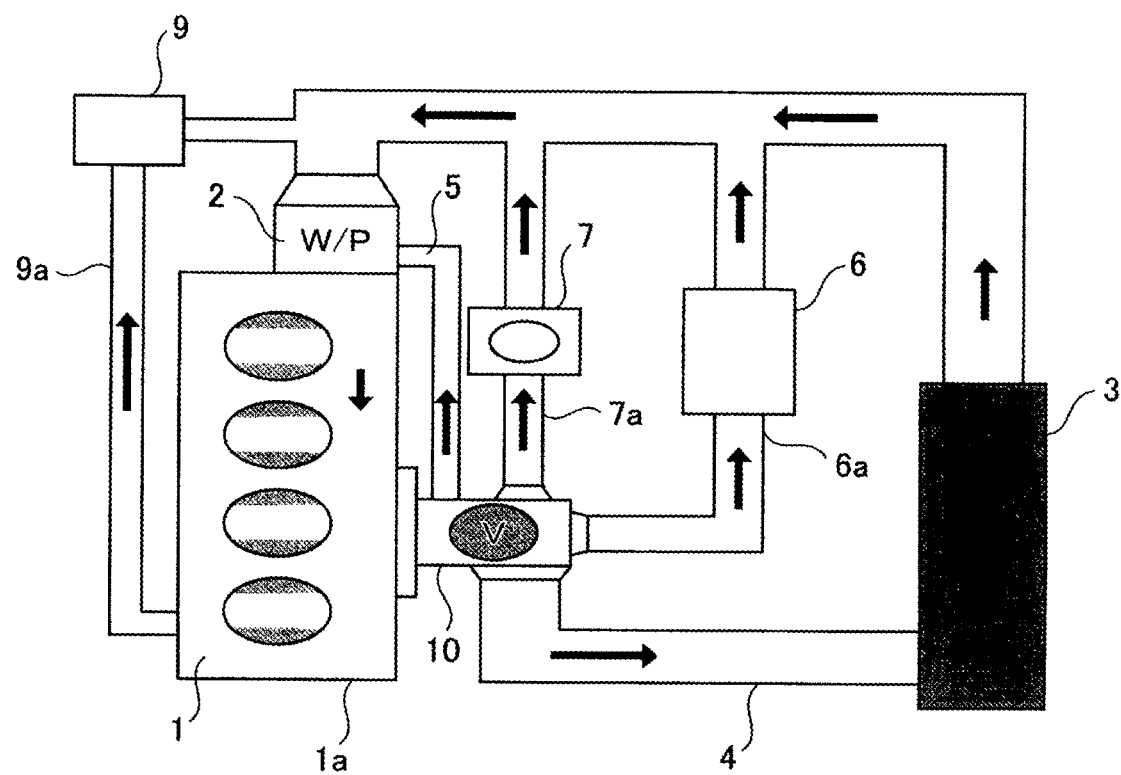

[Fig. 2]
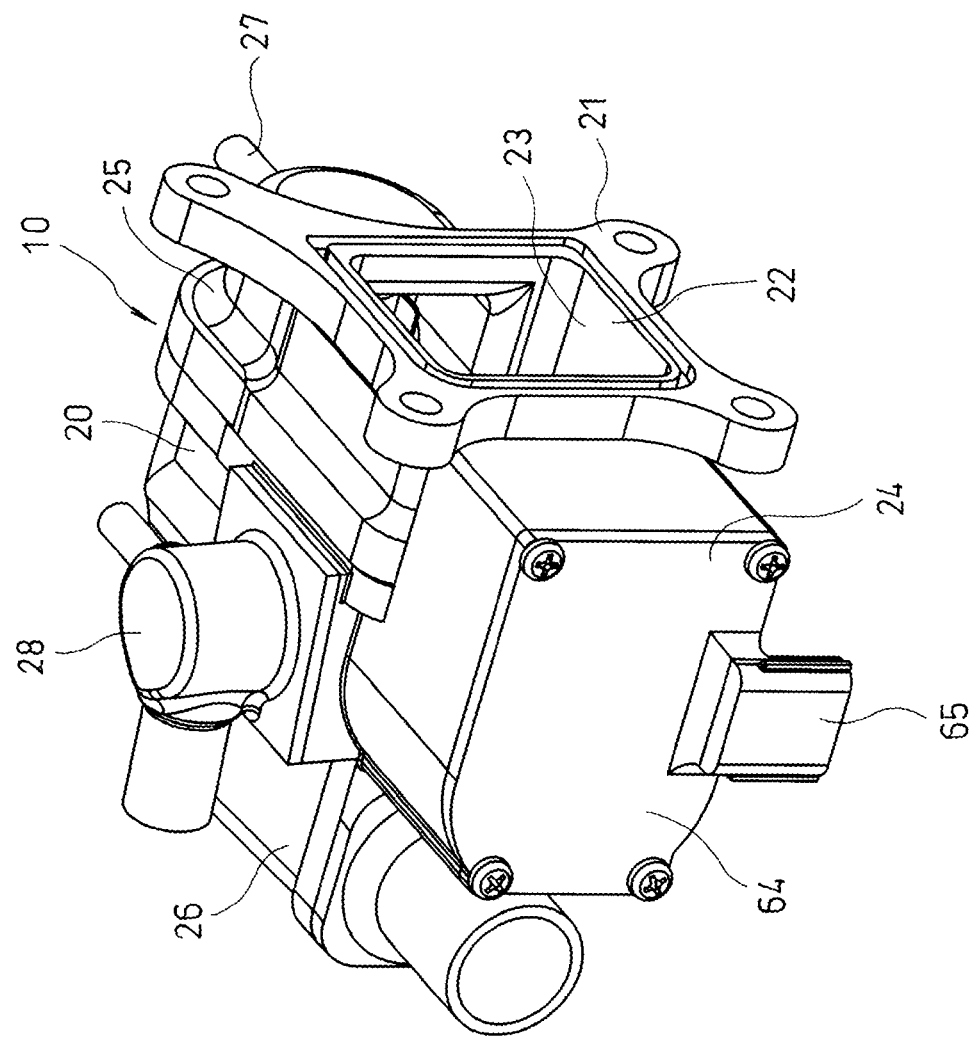

[Fig. 3]
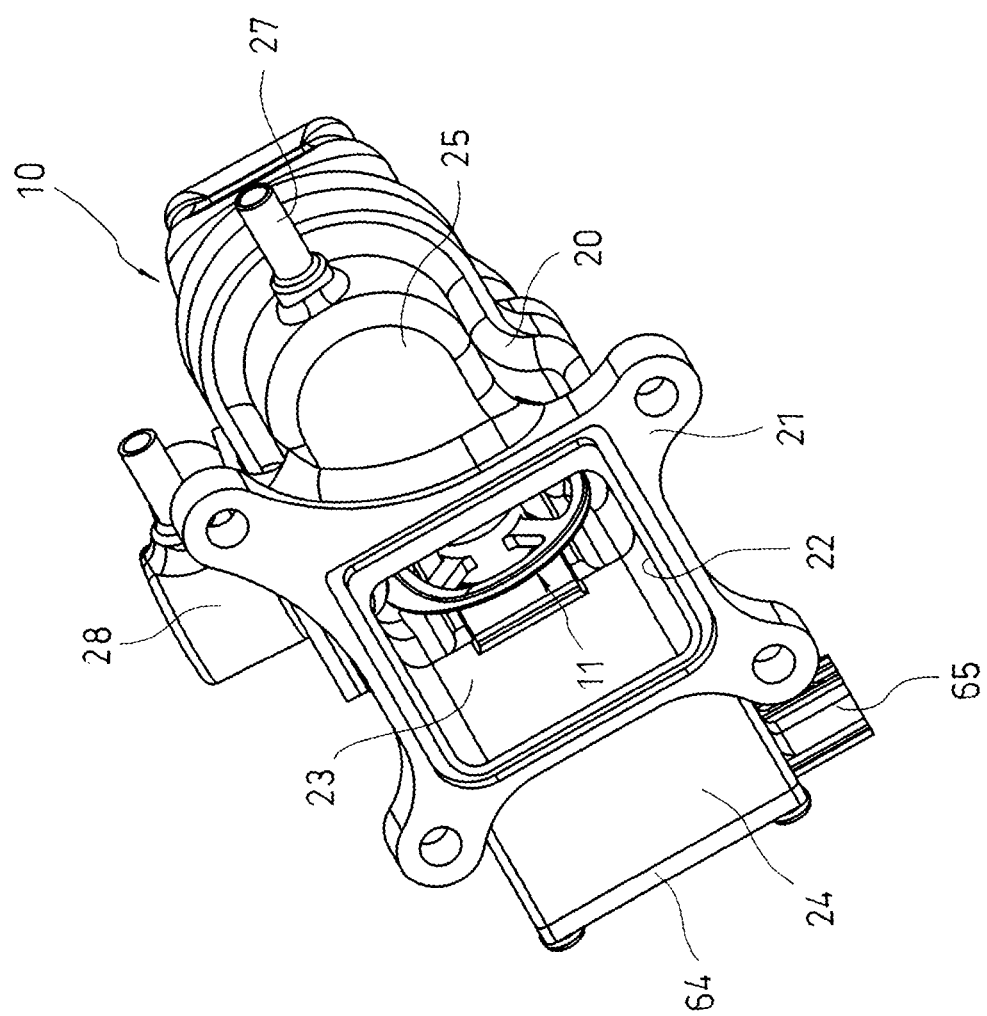

[Fig. 4]
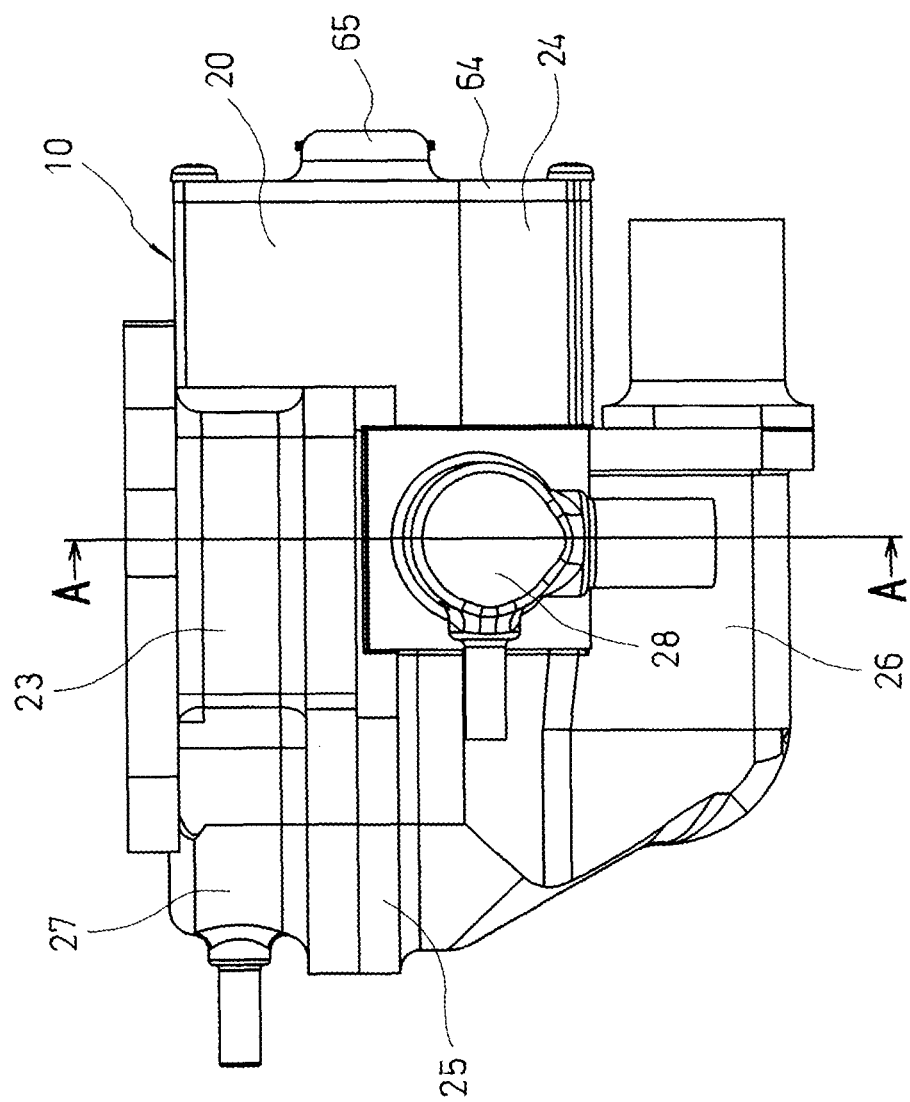

[Fig. 5]
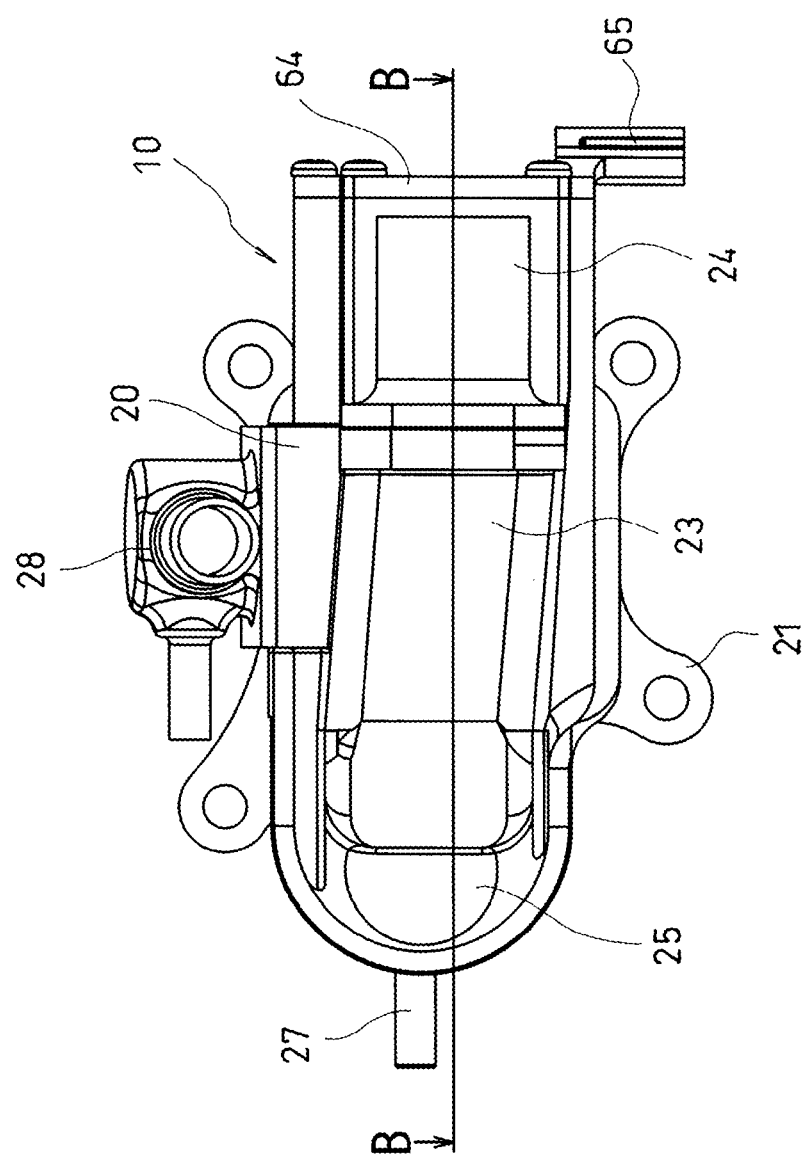

[Fig. 6]
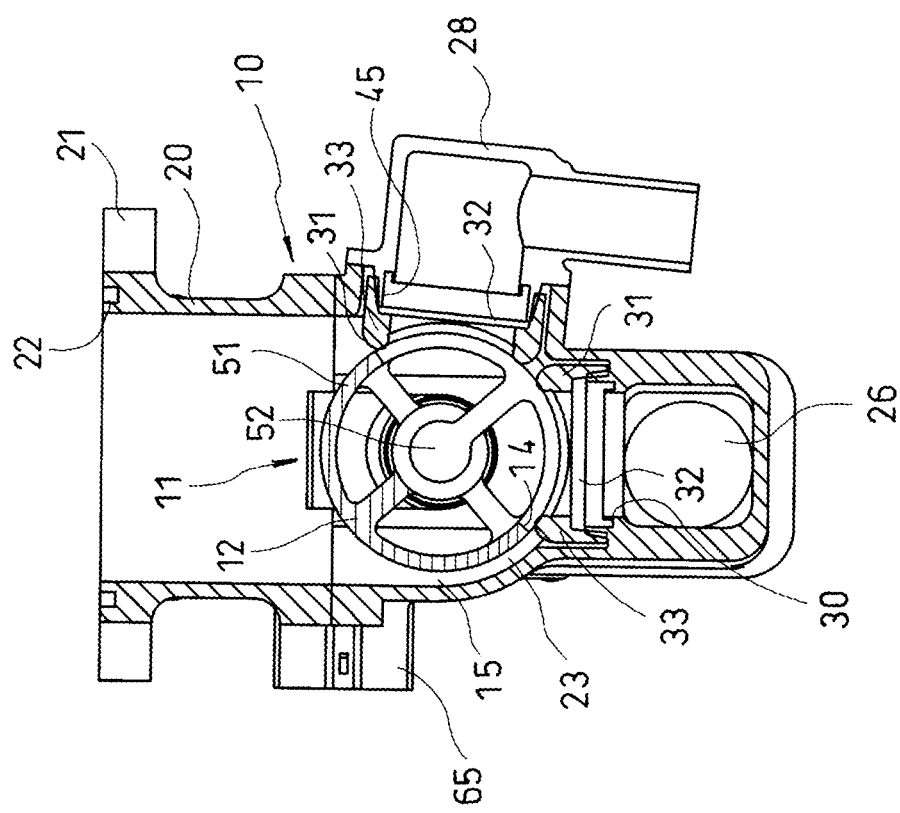

[Fig. 7]
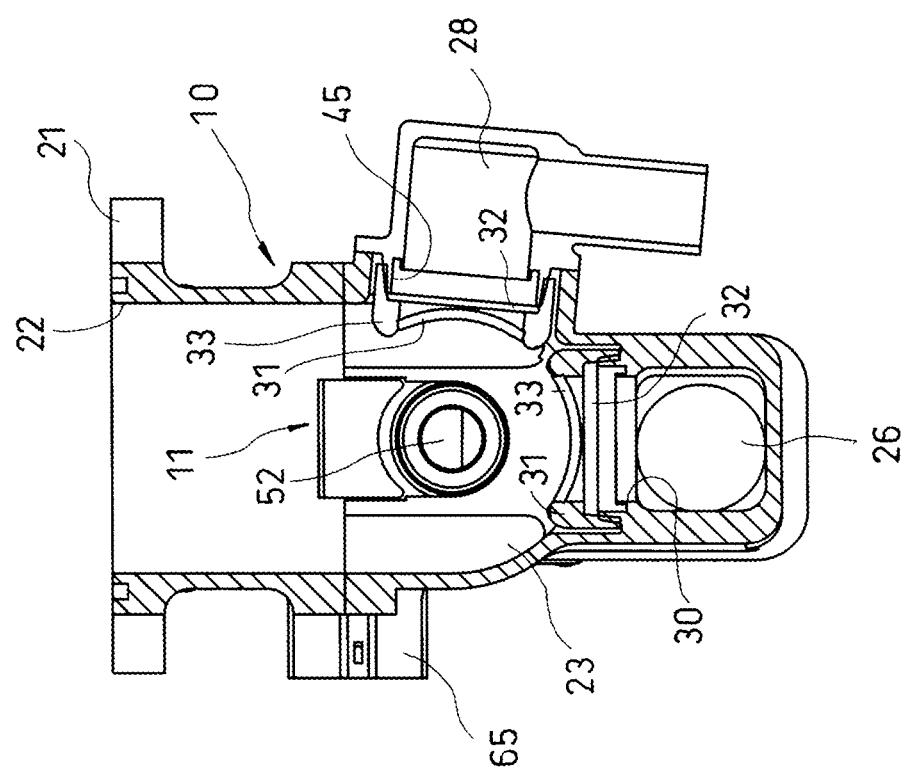

[Fig. 8]
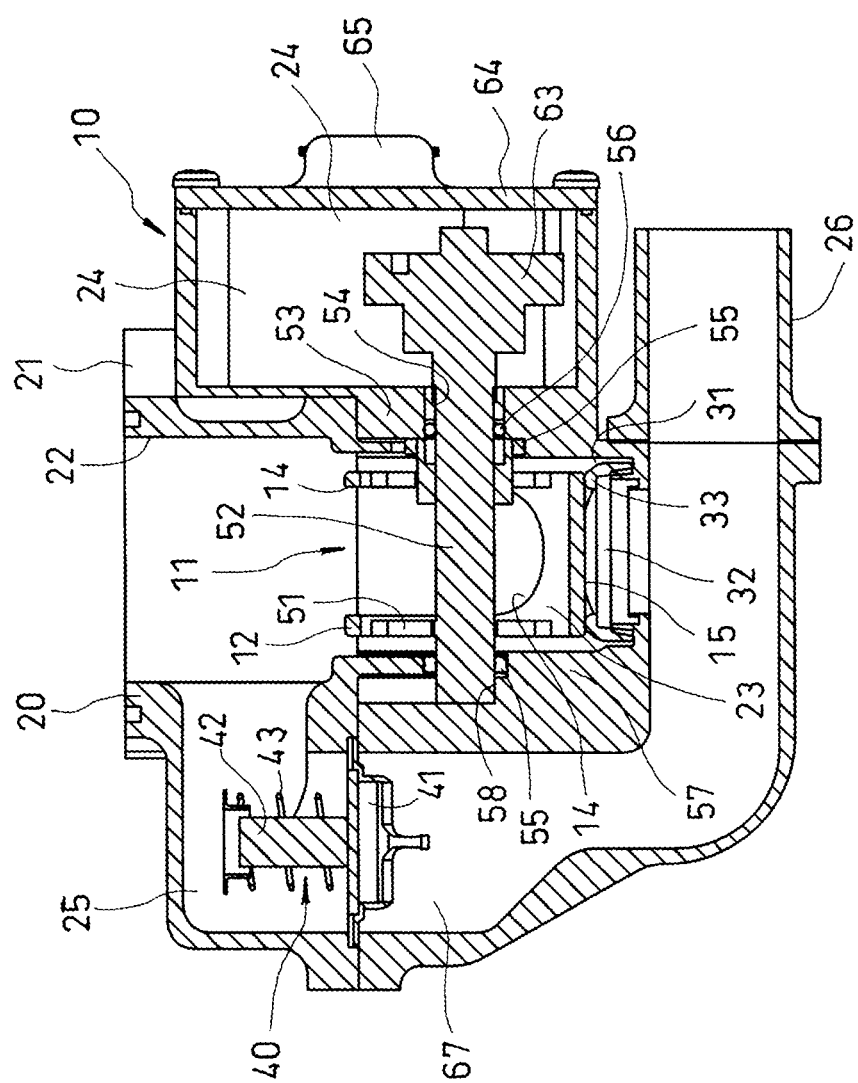

[Fig. 9]
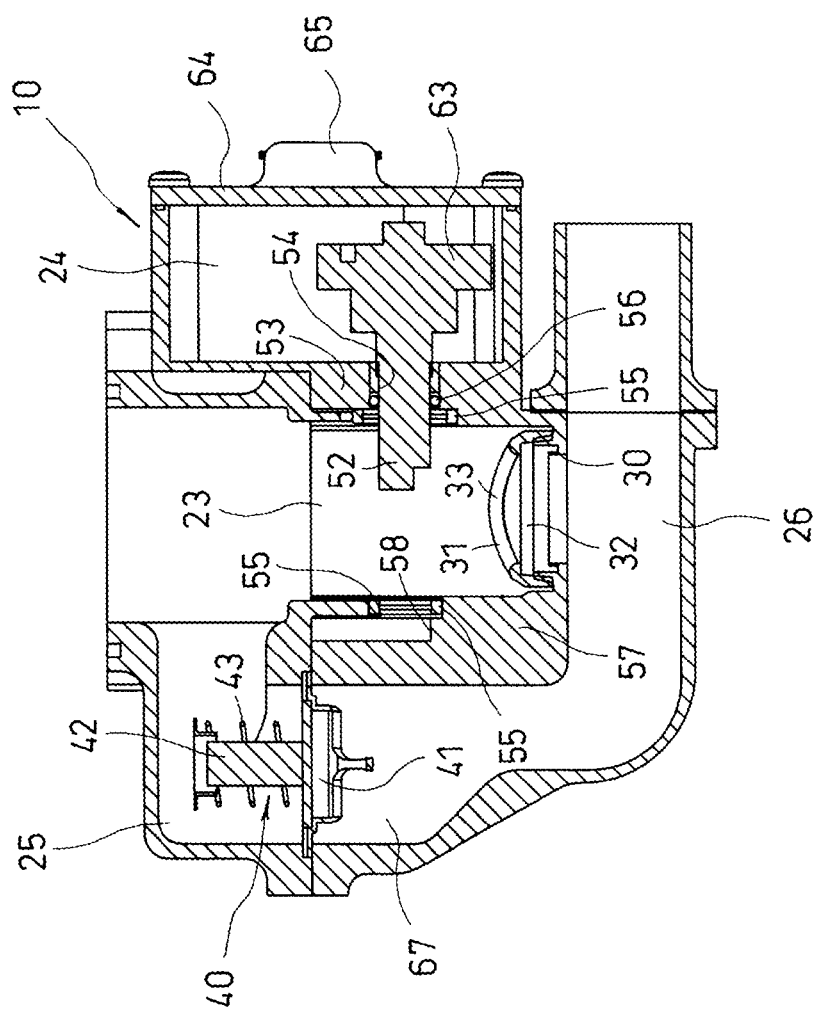

[Fig. 10]
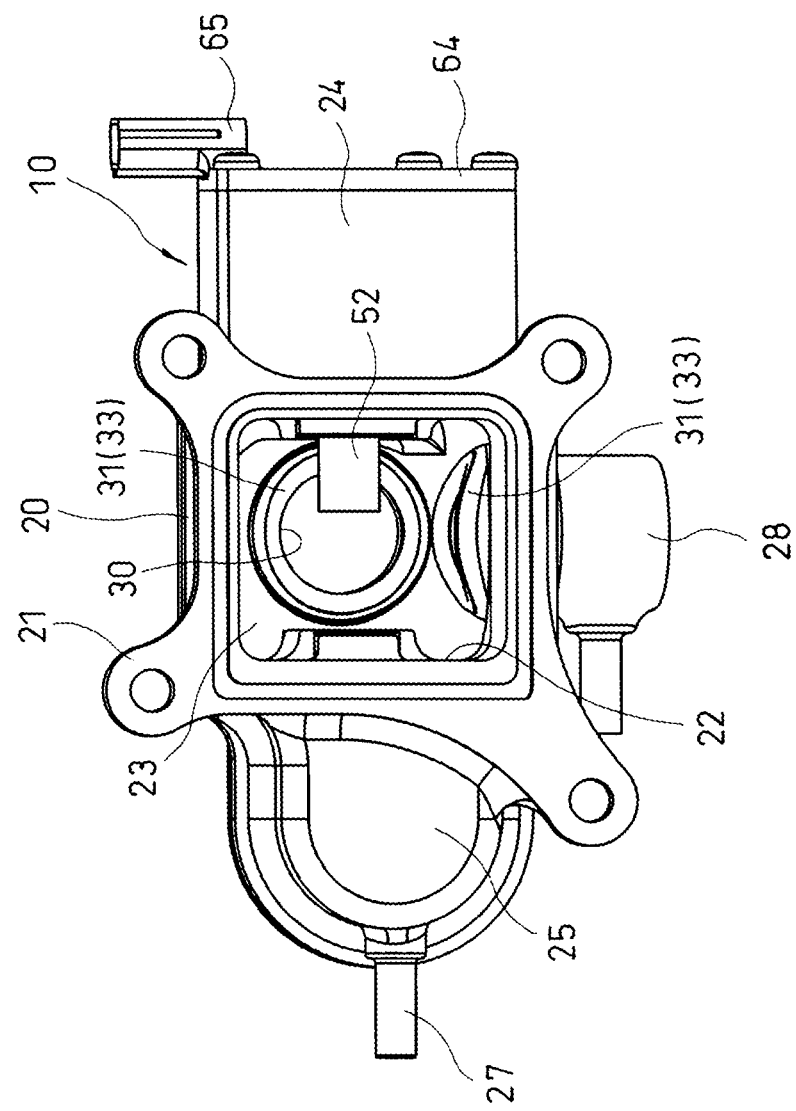

COOLANT CONTROL VALVE APPARATUS

TECHNICAL FIELD

The present invention relates to a coolant control valve apparatus that controls coolant when water-cooling an engine of a vehicle or the like.

BACKGROUND ART

With regard to an engine (internal combustion engine) of a car such as a vehicle, it has been examined that, for the purpose of the improvement of a warm-up performance of the engine, the improvement of a fuel efficiency by moving the engine at an appropriate temperature and the like, by providing, besides a main passage which circulates coolant between the engine and a radiator, a bypass passage which bypasses the radiator and returns the coolant directly to the engine, and by providing a coolant control valve in the main passage, and further by controlling an opening degree of this coolant control valve according to a coolant temperature and other values, an amount of the coolant that is flown in the main passage and is cooled off by the radiator is controlled. Incidentally, the coolant water is circulated by a pump that is driven by the engine or an electric motor, more specifically, the coolant water is circulated mainly in the main passage while the engine is operated and the coolant control valve is opened, and the coolant water is circulated in the bypass passage while the coolant control valve is closed.

For example, at the engine starting or the like, when the coolant temperature is low, by blocking the main passage and returning the coolant from the bypass passage directly to the engine without allowing the coolant to pass through the radiator, warm-up of the engine is promoted. Also, for example, for controlling the temperature of the coolant so as to optimize combustion of fuel in the engine after the warm-up, opening and closing (the opening degree) of the coolant control valve is controlled. As such a coolant control valve, use of, for example, a rotary valve that is driven by a stepping motor or the like are examined (for example, see Patent Literature 1).

The rotary valve requires motive power both when being changed from an opened state to a closed state and when being changed from the closed state to the opened state, but can have a structure that does not require such motive power both while maintaining its opened state and while maintaining its closed state, which exhibits an effect of saving energy comparing to a valve that requires energy for maintaining its closed state or opened state.

CITATION LIST

Patent Literature

Patent Literature 1: JP 2002-97958 W

SUMMARY OF INVENTION

Technical Problem

For example, the rotary valve includes: a cylindrical rotor provided with an opening part for ejecting liquid from an inside to an outside thereof; and a casing which is provided substantially tubularly so as to surround at least a part of a surrounding of the rotor and has an inlet port that is overlapped with an opening part of the rotor so that the liquid can be ejected while the rotor is within a predetermined range of an angle.

In this case, while the rotary valve is closed, in order to prevent leakage of water, the rotor is preferably rotated with respect to a housing in a state where an outer surface of the cylindrical rotor and an inner surface of the substantially cylindrical housing are substantially in touch with each other.

However, for example, coolant water of a vehicle is likely to contain corrosion generated in the course of the coolant water and an extraneous material such as a tramp material that comes from the outside.

If using the rotary valve in the state where such an extraneous material is mixed in the coolant water, the extraneous material is possibly involved between the rotor and its surrounding housing, thereby causing to stop the rotation of the rotor. For example, while the rotary valve closes a main passage that sends the coolant water to a radiator, if such an extraneous material is involved between the rotor and the housing and the rotor is stopped, the coolant water cannot be sent to the radiator when a temperature of an engine is increased, whereby the temperature of the engine may be further increased.

Therefore, considering such overheating, knocking and the like of the engine, it is difficult to adopt the rotary valve to the coolant water control valve in the cooling system of the engine in which the coolant water contains such an extraneous material.

The present invention has been achieved in the light of the above-described problems, and aims to provide a coolant control valve apparatus using a rotary valve that can suppress the involvement of an extraneous material and can rotate a rotor even when such an extraneous material is intervened.

Solution to Problem

In order to attain the above-described object, the coolant control valve apparatus according to the present invention controls a flow rate of coolant water in a channel for circulating the coolant water between an engine and a radiator, the coolant control valve apparatus has a rotary valve that controls the flow rate of the coolant water in the channel, wherein the rotary valve includes: a substantially cylindrical rotor whose outer peripheral surface has a rotor-side opening part; and a casing which has an inner peripheral surface facing the outer peripheral surface of the rotor so as to store the rotor, and is provided with a casing-side opening part that allows the coolant water to flow into the channel when the inner peripheral surface and the rotor-side opening part are arranged to be overlapped with each other, a gap is formed between the outer peripheral surface of the rotor and the inner peripheral surface of the casing, the casing-side opening part includes a sealing member which protrudes from the casing-side opening part to the rotor side so as to be in touch with the outer peripheral surface of the rotor, and the sealing member composes a channel that connects the rotor-side opening part and the casing-side opening part.

In the present invention, since the wide gap is provided between the outer peripheral surface of the rotor and the inner peripheral surface of the casing, even when an extraneous material contained in the coolant water intrudes between the rotor and the housing, the extraneous material is not involved therebetween, so that the rotor can be maintained to be rotatable.

In this case, however, the coolant water flows between the rotor and the housing, and a main channel cannot be closed. Then, the sealing member which protrudes from the housing opening part to the rotor side so as to be in touch with the outer peripheral surface of the rotor is provided, and this sealing member composes a channel that connects the rotor-side opening part and the casing-side opening part. Thereby, in the state where the rotor-side opening part and the housing opening part are overlapped with each other, the sealing member functions as the channel for allowing the coolant water to flow from the rotor side to the casing side, and in the state where the rotor-side opening part and the housing opening part are not overlapped with each other, the outer peripheral surface of the rotor that is in touch with the sealing member closes an opening of the sealing member that is provided to the housing-side opening part, whereby the main channel can be in the closed state.

According to the above-described structure, by estimating the largest diameter of the extraneous material contained in the coolant water, the gap provided between the outer surface of the rotor and the inner peripheral surface of the casing can be changed appropriately to have a width that corresponds to the thus obtained size of the extraneous material. The largest diameter of the extraneous material can be obtained by, for example, sampling the coolant water of the engine that is actually used and then measuring diameters of extraneous materials contained therein. Also, in the case of using a mesh member, such as a strainer, for filtering the coolant water, the maximum diameter of the extraneous material may be determined according to a mesh size of the mesh member.

In the above-described structure of the present invention, it is preferable that the sealing member is supported elastically by an elastic unit so that the sealing member can be moved in a direction away from the outer peripheral surface of the rotor.

According to such a structure, such an extraneous material may be involved between the outer peripheral surface of the rotor and the sealing member, however, since the sealing member is supported by the elastic unit so that the sealing member can be moved in a direction away from the outer peripheral surface of the rotor, even if the extraneous material is involved between the outer peripheral surface of the rotor and the sealing member, the sealing member is moved backward by resisting against an added force of the elastic unit while the rotor is rotated, whereby the rotation of the rotor can be prevented from being inhibited. That is, more serious involvement of such an extraneous material, which is caused by rotating the rotor in the state where the extraneous material is intervened between the outer peripheral surface of the rotor and the sealing member, can be prevented, whereby the rotor can be maintained to be rotatable.

In addition, in the above-described structure of the present invention, it is preferable that the rotor has a rotation axis whose both end parts protrude respectively from end surfaces of the rotor so as to support the rotor rotatably, and the casing includes a tubular bearing part in which the rotation axis of the rotor is inserted and which supports the rotation axis of the rotor rotatably, annular seals are provided between the rotation axis and the bearing part and have X-shaped cross-sections, and in addition to the seals having the X-shaped cross-sections, a seal is further provided between the one end part which is driven by the driving unit among the end parts of the rotation axis and the bearing part.

According to such a structure, the involvement of an extraneous material can be prevented by providing the wide gap between the rotor and the casing as described above, however, due to the wide gap, the coolant water inflows between the rotor and the casing easily. According to this, the coolant water easily inflows between the rotor and the casing in a direction of the rotation axis of the rotor, whereby such an extraneous material is likely to intrude therebetween as well. This extraneous material in the coolant water enters between the rotation axis of the rotor and its bearing part, and the rotation of the rotor may be prevented thereby. Then, by disposing the seals having X-shaped cross-sections between the rotation axis and the bearing part, each of the seals contacts the outer peripheral surface of the rotation axis and the inner peripheral surface of the bearing part in two sites, respectively, whereby the intrusion of the extraneous material can be suppressed. By further providing the seal on the side connected to the driving unit, the coolant water can be prevented from reaching the driving unit side securely. Thereby, even by providing the wide gap between the rotor and the casing, the smooth rotation of the rotor can be secured.

Advantageous Effects of Invention

According to the present invention, even by adopting the rotary valve to the control valve for the coolant water containing an extraneous material, operational failure of the rotor of the rotary valve caused by the involvement of the extraneous material can be prevented. Thus, the circulatory arrest of the coolant water between the radiator and the engine at the time of increasing the temperature of the engine, which is caused by such operational failure of the rotary valve, can be prevented. Thereby, the rotary valve that is effective to control the coolant water can be employed.

BRIEF DESCRIPTION OF DRAWINGS

FIG. 1 is a cooling circuit diagram illustrating an outline of an engine cooling system that adopts the coolant control valve apparatus of an embodiment of the present invention.

FIG. 2 is a perspective view that illustrates the coolant control valve apparatus.

FIG. 3 is a perspective view that illustrates the coolant control valve apparatus.

FIG. 4 is a side view that illustrates the coolant control valve apparatus.

FIG. 5 is a front view that illustrates the coolant control valve apparatus.

FIG. 6 is a cross-sectional view taken in a direction of an arrow A-A in FIG. 4.

FIG. 7 is a cross-sectional view taken in the direction of the arrow A-A in FIG. 4, in which a rotor is removed.

FIG. 8 is a cross-sectional view taken in a direction of an arrow B-B in FIG. 5.

FIG. 9 is a cross-sectional view taken in the direction of the arrow B-B in FIG. 5, in which the rotor is removed.

FIG. 10 is a perspective view of the coolant valve apparatus, in which the rotor is removed.

DESCRIPTION OF EMBODIMENTS

Hereinafter, an embodiment of the present invention will be described with reference to the accompanying drawings.

As illustrated in FIG. 1, an engine cooling system that adopts a coolant control valve apparatus 10 of this embodiment includes: the coolant control valve apparatus 10 that is provided communicating with a water jacket 1a of an engine 1; a water pump 2 that is provided communicating with the water jacket 1a so as to circulate coolant; a radiator 3 for cooling off the coolant; a main channel 4 for circulating the water from the water jacket 1a through the coolant control valve apparatus 10, the radiator 3, and the water pump to return the water to the water jacket 1a again.

Moreover, in the engine cooling system, the bypass channel 5 is provided to bypass the radiator 3, that is, the bypass channel 5 is disposed from the coolant control valve apparatus 10 to the water pump 2 without passing through the radiator 3, and even when the coolant control valve apparatus 10 closes the main channel 4, the water from the water jacket 1a can be circulated by the water pump 2 to pass through the bypass channel 5. Incidentally, the water pump 2 is driven by driving force of the engine 1.

Thereby, in the case where a coolant temperature is low at engine starting or the like, by closing the main channel 4 in the coolant control valve apparatus 10, the coolant is heated by the heat of the engine 1 without being cooled off by the radiator 3.

Moreover, between the coolant control valve apparatus 10 and the water pump 2, a sub channel 6a that passes through the heater 6 and a sub channel 7a that passes through a throttle 7 (a water jacket for a throttle) are provided, in addition to the main channel 4 and the bypass channel 5. Incidentally, each of the channels is formed by a pipe, for example.

Also, in a vehicle, exhaust gas recirculation (EGR) may be performed. The EGR is a technique for refluxing a part of exhaust gas to an inlet side so as to allow an engine to breathe the exhaust gas again, whereby a concentration of nitrogen oxide and the like can be reduced.

The EGR valve 9 is for controlling a volume of exhaust gas that is refluxed to the inlet side, and is cooled off by the coolant of the engine. In this embodiment, the water pump 2 and an EGR cooling channel 9a that is connected to the water jacket 1a are connected to the EGR valve 9 for cooling off. In this embodiment, the EGR cooling channel 9a is structured not to pass through the coolant control valve apparatus 10, but may be structured to pass through the coolant control valve apparatus 10.

Moreover, the coolant control valve apparatus 10 is provided with a rotary main valve 11, and according to a rotation angle of a rotor 12 of this main valve 11, flow rates of the coolant in the main channel 4 and the sub channels 6a and 7a can be changed (the channels can be opened and closed).

As illustrated in FIGS. 2 to 10, the coolant control valve apparatus 10 of this embodiment includes a casing 20 that is attached to circumference of an opening part and including a plurality of members, which is not illustrated, of the water jacket 1a of the engine 1, and the casing 20 includes: a flange part 21 having an opening 22 in a center part thereof to be in communication with the opening part of the water jacket 1a; a principal chamber 23 which has an inner space to be in communication with the opening 22 of the flange part 21 and in which the main valve (rotary valve) 11 having the rotor 12 is disposed; a driving chamber 24 in which a driving means that drives to rotate the rotor 12 is disposed; an auxiliary chamber 25 which is in communication with the principal chamber 23 and in which a fail-safe valve (FS valve) 40 is disposed; a main discharge part 26 which is in communication with the principal chamber 23 and the auxiliary chamber 25, and is connected to the main channel 4; a bypass discharge part 27 which is in communication with the auxiliary chamber 25, and is connected to the bypass channel 5 in a state of being diverged from the auxiliary chamber 25; and a sub discharge part 28 that is connected to the sub channels 6a and 7a.

In a center of the flange part 21, the rectangular opening 22 is formed, and the flange part 21 is shaped so that four corner parts of the opening 22 are extended toward outside, and these extended parts are provided with through holes for bolts that fix the flange part 21 to the water jacket 1a. Each of the openings 22 is in communication with the inside of the water jacket 1a of the engine 1 as described above, and serves as an admission port of the coolant control valve apparatus 10.

Further, at circumference of the opening 22 in the flange part 21, a groove for sealant to be inserted is formed around the opening 22.

The principal chamber 23 includes an inner space which is provided from the opening 22 of the flange part 21 to the main discharge part 26 that is provided on an opposite side of the opening 22 in the casing 20, and in this inner space, the main valve 11 that includes the rotor 12 is disposed. Apart of the principal chamber 23 on the opening side of the flange part 21 is a rectangular parallelepiped space, and a back-side space in which the rotor 12 is disposed has a semicylindrical shape. An inner peripheral surface of this semicylindrical part faces the outer peripheral surface of the rotor 12 at a distance that corresponds to a below-described clearance.

On a side facing the opening 22 of the flange part 21 (an opposite side of the opening 22) in the principal chamber 23, a main opening part 30 that is in communication with the main discharge part 26 is provided. By this opening part 30, the coolant water that inflows from the water jacket 1a of the engine 1 via the opening 22 of the above-described flange part 21 can pass through the main opening part 30, and can flow via the main discharge part 26 into the main channel 4.

In a part close to the sub discharge part 28, the inner peripheral surface of the semicylindrical part of the principal chamber 23 in which the rotor 12 is stored is provided with a sub opening part 45 that is in communication with the sub discharge part 28. By this sub opening part 45, the coolant water that inflows from the water jacket 1a of the engine 1 via the opening 22 of the above-described flange part 21 can pass through the sub opening part 45, and can flow via the sub discharge part 28 into the sub channels 6a and 7a.

In addition, the main opening part 30 and the sub opening part 45 are provided with sealing members 31 that are shaped along outer peripheries of the main opening part 30 and the sub opening part 45, respectively.

The sealing member 31 includes: a plate-shaped elastic member 32 (an elastic unit) provided with a rectangular opening that is in communication with the main opening part 30 or the sub opening part 45; a ring-shaped sealing main body 33 that is fixed with the opening part of the elastic member 32; and fluororesin provided in a part of the sealing main body 33 which is in touch with the outer peripheral surface of the rotor 12.

The plate-shaped elastic member 32 is, for example, a plate-spring made of a stainless steel plate, and in a central part of the elastic member 32, the opening is provided. Moreover, the sealing main body 33 is fixed with the casing 20 via the elastic member 32.

The sealing main body 33 is made of, for example, rubber, and, for example, hydrogenated nitrile rubber is used, and also, other various kinds of rubber and synthetic rubber can be used. For a part (a surface layer) of the sealing main body 33 which is in touch with the outer peripheral surface of the rotor 12, for example, polytetrafluoroethylene is used as the fluororesin, thereby reducing friction with the rotor 12.

The sealing main body 33 can be moved in a direction of a diameter of the cylindrical rotor 12 by the above-described elastic member 32, and when an extraneous material is intervened between the sealing main body 33 and the rotor 12, for example, the sealing main body 33 can be moved in the direction away from the rotor 12. Thereby, such a structure prevents the state where, while the rotor 12 is rotated with intervening the extraneous material, the extraneous material is involved between the sealing main body 33 and the outer peripheral surface of the rotor 12, and the rotation of the rotor 12 becomes significantly difficult.

Between the outer peripheral surface of the rotor 12 and the inner peripheral surface of the casing 20 that faces this outer peripheral surface, a clearance which is wider than the largest diameter of the extraneous material among the extraneous materials that are estimated to be contained in the coolant water is provided. The sealing member 31 of the main opening part 30 protrudes from the inner peripheral surface side of the casing 20 to the outer peripheral surface of the rotor 12, and when a whole circumference of an annular structure of the sealing member 31 is in touch with the outer peripheral surface of the rotor 12, the main valve 11 becomes in a state of closing the main channel 4.

Similarly, the sealing member 31 of the sub opening part 45 protrudes from the inner peripheral surface side of the casing 20 to the outer peripheral surface of the rotor 12, and when a whole circumference of an annular structure of the sealing member 31 is in touch with the outer peripheral surface of the rotor 12, the main valve 11 becomes in a state of closing the sub channels 6a and 7a.

Further, as illustrated in FIGS. 6 and 8, the outer peripheral surface 15 of the rotor 12 has an opening part 14, and when at least a part of this opening part 14 is overlapped with the sealing member 31 of the main opening part 30, the main valve 11 becomes in a state of opening the main channel 4. Moreover, when at least a part of the opening part 14 of the outer peripheral surface 15 of the rotor 12 is overlapped with the sealing member 31 of the sub opening part 45, the main valve 11 becomes in a state of opening the sub channels 6a and 7a.

The rotor 12 includes a substantially cylindrical rotor main body 51 and a rotation axis 52 that is disposed in a center line part of the rotor main body 51. One end part of the rotation axis 52 extends from the principal chamber 23 to the driving chamber 24 side along the center line of the rotor 12 from an end surface of the rotor 12. Further, the rotation axis 52 on this end part side penetrates a partition wall 53 that is between the principal chamber 23 of the casing 20 and the driving chamber 24, and reaches an inside of the driving chamber 24. This part of the rotation axis 52 positioned inside the driving chamber 24 is provided with a gear 63 that will be described below.

Moreover, the part of the partition wall 53 where the rotation axis 52 penetrates is a bearing part 54 that supports the rotation axis 52 rotatably, and an annular seal 55 having an X-shaped cross-section is disposed on an inner peripheral surface of this bearing part 54 between this inner peripheral surface of the bearing part 54 and an outer peripheral surface of the rotation axis 52. This seal 55 is positioned on the bearing part 54 on a side that is close to the principal chamber 23. Moreover, between the outer peripheral surface of the rotation axis 52 on the driving chamber 24 side from this seal 55 and the inner peripheral surface of the bearing part 54, an annular seal 56 having a circular cross-section is disposed. The seal 55 having the X-shaped cross-section is in contact with both of the outer peripheral surface of the rotation axis 52 and the inner peripheral surface of the bearing part 54 in two sites, respectively, so that the inflow of an extraneous material can be more difficult than a case of using an ordinary seal having a circular or rectangle cross-section, whereby the inflow of such an extraneous material can be prevented. Further, by providing both of the seal 55 and the seal 56, leakage of the coolant water to the driving chamber 24 side can be prevented.

Moreover, other end part of the rotation axis 52 is inserted into a bearing part 58 provided on a partition wall 57 which is between the auxiliary chamber 25 positioned on an opposite side of the driving chamber 24 and the principal chamber 23. This bearing part 58 does not penetrate the partition wall 57. Between an inner peripheral surface of this bearing part 58 and the outer peripheral surface of the rotation axis 52, and on the principal chamber 23 side, the seal 55 having the X-shaped cross-section is disposed.

A clearance which is wider than the above-described largest diameter of the extraneous material is provided between a surface of the partition wall 53 of the principal chamber 23 facing the end surface of the rotor 12 on the partition wall 53 side and this end surface of the rotor 12.

In addition, between a surface of the partition wall 57 of the principal chamber 23 facing the end surface of the rotor 12 on the partition wall 53 side and the end surface of this rotor 12, a clearance which is wider than the above-described largest diameter of the extraneous material is provided.

Further, the rotor 12 includes one opening part 14 (or plural openings) and an inner space that is in communication with the opening part 14. A rotation angle of the rotor 12 can switch between an opened state where the opening 22 side and the main discharge part 26 are in communication with each other and a closed state where the opening 22 side and the main discharge part 26 are not in communication with each other, and further, the rotation angle of the rotor 12 can adjust an opening degree thereof.

At the same time, the rotation angle of the rotor 12 can also switch between an opened state where the opening 22 side and the sub discharge part 28 side are in communication with each other and a closed state where the opening 22 side and the sub discharge part 28 side are not in communication with each other, and an opening degree thereof can be adjusted according to the rotation angle of the rotor 12.

Incidentally, only one rotor 12 is provided, but as described above, according to the arrangement of the opening that is provided to the rotor 12, a state where the main channel 4 is opened and the sub channels 6a and 7a is opened or closed can also be realized.

Basically, the wide clearance exists between the outer peripheral surface of the rotor 12 and the inner peripheral surface of the principal chamber 23 that faces this outer peripheral surface, and the principal chamber 23 facing the water jacket 1a of the engine 1 is opened to the coolant water in the water jacket 1a. Thus, only in the case where the sealing members 31 that are provided respectively to the main opening part 30 and the sub opening part 45 are in touch with the outer peripheral surface 15 of the rotor 12 in the part that has no opening, and the sealing members 31 are in a closed state, the main opening part 30 or the sub opening part 45 can be in a closed state.

Here, for example, as illustrated in FIG. 6, in the rotor 12, an opening part 14 whose length in a circumferential direction corresponds to an angle of substantially 180 degrees of, that is, a half of a whole circumferential length of the outer peripheral surface 15 of the rotor 12 is formed. FIG. 6 illustrates the state where the opening part 14 of the rotor 12 is overlapped with the main opening part 30 or the sub opening part 45 of the casing 20. Further, the sealing members 31 are disposed respectively in the main opening part 30 and the sub opening part 45 as described above, and by overlapping each of these sealing members 31 with the opening part 14 of the rotor 12, the openings of the sealing members 31 become in the opened state.

While the openings of the sealing members 31 are in the opened state, each of the sealing members 31 that have short and substantially cylindrical shapes functions as a channel for allowing the coolant water to flow between the main opening part 30 or the sub opening part 45 of the casing 20 and the opening part 14 of the rotor 12, respectively. That is, the above-described gap exists between the outer peripheral surface of the rotor 12 and the inner peripheral surface of the principal chamber 23 of the casing 20 on the opposite side of the opening 22, and each of these sealing members 31 is disposed in this gap and is served as the channel from the opening part 14 of the rotor 12 to the main opening part 30 or the sub opening part 45 of the casing 20.

The driving chamber 24 is isolated by the partition wall 53 that is disposed between the driving chamber 24 and the principal chamber 23, and the rotation axis 52 for rotating the rotor 12 penetrates the partition wall 53 as described above so as to be connected to the rotor 12, thereby driving to rotate the rotor 12. In the driving chamber 24, the gear 63 which is provided to the rotation axis 52 and is rotated around the rotation axis 52 as a rotation center is disposed, and a gear attached to a motor (a servomotor, a stepping motor or the like) that can control its rotation angle, which is not illustrated, is engaged with the gear 63 directly or indirectly via another gear so as to rotate the gear 63.

The motor is controlled by a controlling device (a controlling means) which is not illustrated, and for example, its rotation angle is controlled by a coolant temperature that is detected by a sensor and is input into the controlling device, a room temperature in a vehicle which is related to the heater 6 or the like. Incidentally, the communication between the opening 22 and the main discharge part 26 comes into the opened state to cool off the coolant by the radiator 3 basically when the coolant temperature reaches a preset temperature or higher, and comes into the closed state when the temperature of the coolant is lower than the preset temperature, but while being in the opened state, the flow rate of the coolant is also controlled according to the coolant temperature or the like.

Moreover, the driving mechanism for the rotor 12, such as the motor and the gear 63, is arranged so as to be stored in the driving chamber 24. In the driving chamber 24, a cover 64 that can be opened and closed is fastened by a screw, and a terminal part 65 that is provided with a terminal of a wiring for transmission of electric power to the motor and transmission of a control signal is disposed. The maximum driving torque of the motor in the driving mechanism of the rotor 12 is higher than the driving torque that is required to rotate the rotor 12 when the extraneous material with the above-described largest diameter is intervened between the rotor 12 and the sealing member 31.

Incidentally, the driving torque, which is required to rotate the rotor 12 when the extraneous material with the above-described maximum diameter is intervened between the rotor 12 and the sealing member 31, can be obtained experimentally. For example, the outer peripheral surface of the rotor 12 is provided with a protrusion with a diameter equal to the maximum diameter of the extraneous material that is estimated to be contained in the coolant water, and the rotor 12 is rotated by a motor with a high driving torque in a state where the sealing member is in touch with this rotor 12, whereby the maximum driving torque during the rotation is obtained. Incidentally, the motor used here is a motor with a driving torque that is higher than this maximum driving torque.

The auxiliary chamber 25 is structured to be in communication with the principal chamber 23 at the opening 22 side of the flange part 21 (the engine 1 side) with respect to the rotor 12, and also to be in communication with the main discharge part 26, whereby the opening 22 and the main discharge part 26 are in communication with each other. Thus, the principal chamber 23 opens and closes the communication between the opening 22 and the main discharge part 26 by the main valve 11 that is provided with the rotor 12, and on the other hand, the auxiliary chamber 25 detours around the main valve 11 so that the opening (admission port) 22 which is in communication with the inside of the water jacket 1a of the engine 1 and the main discharge part (exhaust port) 26 may be in communication with each other.

This auxiliary chamber 25 serves as a detour channel 67 that allows the admission port and the exhaust port of the coolant control valve apparatus 10 to be in communication with each other by detouring around the main valve 11.

The FS valve 40 is disposed in the auxiliary chamber 25 that serves as this detour channel 67, and opens and closes the detour channel 67 by which the opening 22 side and the main discharge part 26 are in communication with each other. The FS valve 40 is provided with: a valve main body 41 that opens and closes the detour channel 67; a temperature detection medium 42 that drives to open and close the valve main body 41 according to a temperature change; and a returning spring 43 that energizes the valve main body 41 toward the open side.

As the temperature detection medium 42, for example, a thermowax, is used, and also, a thermostat, shape-memory alloy and the like can be adopted, as far as they can open and close the valve at a preset temperature by their displacement according to the temperature. When the temperature becomes higher than the preset temperature (range), the temperature detection medium 42 opens the valve main body 41 so that the opening 22 and the main discharge part 26 may be in communication with each other, and when the temperature becomes lower than the preset temperature (range), the temperature detection medium 42 closes the valve main body 41 so as to shield between the opening 22 and the main discharge part 26. Incidentally, in the temperature detection medium 42, the thermowax is stored inside a casing, and a known mechanism for driving the valve main body 41 corresponding to expansion and contraction of the thermowax is incorporated.

Further, the preset temperature of the FS valve 40 is higher than the above-described preset temperature of the main valve 11 for opening and closing the communication between the opening 22 and the main discharge part 26, and the temperature detection medium 42 operates to open the valve main body 41 of the FS valve 40, when the temperature becomes higher than the preset temperature at which the main valve 11 opens the communication between the opening 22 and the main discharge part 26.

The returning spring 43 energizes the valve main body 41 toward the open side, and if, for example, the temperature detection medium 42 is broken and the valve main body 41 becomes in a state where it can be opened and closed freely, the returning spring 43 opens the valve main body 41. Thereby, even when the FS valve 40 is not operated, if the valve main body 41 is in a state where it can be opened and closed freely, the valve main body 41 can be opened.

Further, in the auxiliary chamber 25, the bypass discharge part 27 that is connected to the bypass channel 5 is provided communicating with the inside of the auxiliary chamber 25. Thus, the actual bypass channel 5 extends from the opening 22 of the flange part 21 of the casing 20 in the coolant control valve apparatus 10, passes through the part of the principal chamber 23 at the opening 22 side with respect to the rotor 12, reaches the auxiliary chamber 25 of the casing 20, and is connected to a tube that is not illustrated and constitutes a main part of the bypass channel 5 from the bypass discharge part 27, whereby the coolant is sucked by the water pump 2 from the bypass channel 5.

In the above-described coolant control valve apparatus 10, the clearance which is wider than the estimated largest diameter of the extraneous material is provided between the inner peripheral surface of the casing 20 facing the outer peripheral surface of the rotor 12 and this outer peripheral surface of the rotor 12. Further, the clearance which is wider than the estimated largest diameter of the extraneous material is provided between the surface of the partition wall 53 facing the one end surface of the rotor 12 and the one end surface of the rotor 12. Moreover, the clearance which is wider than the estimated largest diameter of the extraneous material is provided between the surface of the partition wall 57 facing the other end surface of the rotor 12 and the other end surface of the rotor 12.

Thus, in a part other than the sealing member which protrudes from the inner peripheral surface of the casing 20 to the rotor 12 so as to be in touch with the rotor 12, the involvement of an extraneous material between the rotor 12 and the casing 20 can be prevented.

Moreover, between the sealing member 31 and the outer peripheral surface of the rotor 12, an extraneous material may be involved after being intervened. However, since the sealing main body 33 is supported by the plate-spring 32 of the sealing member 31, the sealing main body 33 can be moved in the direction away from the rotor 12, thereby the rotor 12 can be prevented from being stopped by the involvement of such an extraneous material between the sealing member 31 and the outer peripheral surface of the rotor 12.

In addition, since the driving torque that can be output from the motor as the driving unit for rotating the rotor 12 is set to be higher than the driving torque that is required to rotate the rotor 12 in the state where an extraneous material is intervened between the rotor 12 and the sealing member 31, the rotor 12 can be rotated even in the state where such an extraneous material is intervened between the sealing member 31 and the rotor 12.

Thereby, fixation of the rotor 12 caused by the involvement of such an extraneous material can be prevented. For example, if the rotor 12 is fixed in the state where the main valve 11 closes the main channel 4, the rotor 12 is not rotated, and thus, the coolant water cannot be circulated, so that the temperature of the coolant water becomes too high. However, by setting the width of the gap to be more than the diameter of an extraneous material as the present embodiment, an extraneous material is not involved between the rotor 12 and the casing 20, thereby suppressing the fixation of the rotor 12 significantly. Accordingly, the rotary valve can be used for the coolant control of the engine. Further, by using the gear 63 in the driving mechanism of the rotor 12, the main valve 11 can be maintained in the opened state or the closed state without consuming any electric power, thereby saving the consumption of the electric power.

Moreover, by the above-described clearance, the coolant water easily intrudes between the casing 20 and the rotor 12, and accordingly, an extraneous material may intrudes into the bearing parts 54 and 58 easily. As a countermeasure against the above, the use of the seals 55 having the X-shaped cross-sections can prevent the intrusion of the coolant water and the extraneous material between each of the inner peripheral surfaces of the bearing parts 54 and 58 and the outer peripheral surface of the rotation axis 52. Moreover, in addition to the seals 55, the seal 56 is disposed on the one end part side of the rotation axis 52 to which the motor is connected, whereby the leakage of the coolant water to the driving chamber 24 side can be prevented.

REFERENCE SIGNS LIST 1 engine
3 radiator
4 main channel
5 bypass channel
10 coolant control valve apparatus
11 main valves (rotary valve)
12 rotor
20 casing
30 main opening part
31 sealing member
32 elastic member (spring)
52 rotation axis
54 bearing part
55 seal
56 seal
57 bearing part

The invention claimed is:

1. A coolant control valve apparatus that controls a flow rate of coolant water in a channel for circulating the coolant water between an engine and a radiator, the coolant control valve apparatus comprising a rotary valve that controls the flow rate of the coolant water in the channel, the rotary valve including:
   a substantially cylindrical rotor whose outer peripheral surface has a rotor-side opening part; and a casing which has an inner peripheral surface facing the outer peripheral surface of the rotor so as to store the rotor, and is provided with a casing-side opening part that allows the coolant water to flow into the channel when the casing-side opening part and the rotor-side opening part are arranged to be overlapped with each other,
   wherein a gap is formed between the outer peripheral surface of the rotor and the inner peripheral surface of the casing, throughout all of the outer peripheral surface of the rotor,
   wherein the casing-side opening part includes a sealing member which protrudes from the casing-side opening part to the rotor side so as to be in touch with the outer peripheral surface of the rotor,
   wherein the sealing member composes a channel that allows the coolant water to flow from the rotor-side opening part to the casing-side opening part,
   wherein a gap is formed between a first end surface of the rotor and a first surface of the casing facing the first end surface of the rotor,
   wherein a gap is formed between a second end surface of the rotor and a second surface of the casing facing the second end surface of the rotor,
   wherein the rotor has a rotation shaft extending through the rotor so that a first end part and a second end part of the rotation shaft protrude respectively from the first end surface and the second end surface of the rotor so as to support the rotor rotatably, and wherein the casing includes a tubular bearing part in which the rotation shaft of the rotor is inserted and which supports the rotation shaft of the rotor rotatably.

2. The coolant control valve apparatus according to claim 1, wherein the sealing member is supported elastically by an elastic unit so that the sealing member can be moved in a direction away from the outer peripheral surface of the rotor.

3. The coolant control valve apparatus according to claim 2,
   wherein annular seals are provided between the rotation shaft and the bearing part, and in addition to the seals, a seal is further provided between the first end part which is driven by a driving unit of the rotation shaft and the bearing part.

4. The coolant control valve apparatus according to claim 1,
   wherein annular seals are provided between the rotation shaft and the bearing part, and in addition to the seals, a seal is further provided between the first end part which is driven by a driving unit of the rotation shaft and the bearing part.

\* \* \* \* \*